US008652398B2

(12) United States Patent
Peterman et al.

(10) Patent No.: US 8,652,398 B2
(45) Date of Patent: Feb. 18, 2014

(54) REGENERATIVE MELTING FURNACE WITH EASILY DETACHABLE MEDIA BOX

(75) Inventors: John M. Peterman, Weldon Spring, MO (US); Mark A. Roberts, St. Charles, MO (US)

(73) Assignee: Gillespie + Powers, Inc., St. Louis, MO (US)

( * ) Notice: Subject to any disclaimer, the term of this patent is extended or adjusted under 35 U.S.C. 154(b) by 343 days.

(21) Appl. No.: 13/193,257

(22) Filed: Jul. 28, 2011

(65) Prior Publication Data
US 2012/0024205 A1    Feb. 2, 2012

Related U.S. Application Data

(60) Provisional application No. 61/369,365, filed on Jul. 30, 2010.

(51) Int. Cl.
*F23B 90/00* (2011.01)
(52) U.S. Cl.
USPC ............................................ 266/265; 431/11
(58) Field of Classification Search
USPC .................................... 266/265; 431/11, 215
See application file for complete search history.

(56) References Cited

U.S. PATENT DOCUMENTS

| 5,393,190 A | 2/1995 | Vickary |
| 2002/0072020 A1 | 6/2002 | Crane et al. |
| 2006/0093978 A1* | 5/2006 | Simard et al. ................. 431/215 |
| 2012/0023724 A1* | 2/2012 | Peterman ...................... 29/426.3 |
| 2012/0164588 A1* | 6/2012 | Rauch .............................. 431/11 |

FOREIGN PATENT DOCUMENTS

| WO | WO2006047857 | 5/2006 |
| WO | WO2009067327 | 5/2009 |

OTHER PUBLICATIONS

PCT International Search Report dated Mar. 7, 2012, for the International Application No. PCT/US2011/045815, International Filing Date Jul. 29, 2011.
PCT Written Opinion of the International Searching Authority dated Mar. 7, 2012, for the International Application No. PCT/US2011/045815, International Filing Date Jul. 29, 2011.

* cited by examiner

*Primary Examiner* — Scott Kastler
(74) *Attorney, Agent, or Firm* — Polster, Lieder, Woodruff & Lucchesi, L.C.

(57) ABSTRACT

A burner assembly comprising a burner with a body and a burner throat extending downwardly from the burner body, a carriage located below the burner and provided with a cradle, a media box configured to pivotally mate with the cradle along a horizontal axis of the media box such that the media box is supported on the carriage at the axis and can rotate on the carriage about the axis, the media box having a port that connects with the burner throat but that separates from the burner throat when the media box is tilted about its axis, and media in the media box to serve as a heat sink, where the axis is horizontally offset from the media box's center of gravity, and the media box may be rotated about the horizontal axis to allow for ready engagement and disengagement between the media box and the burner.

17 Claims, 7 Drawing Sheets

REGENERATIVE MELTING FURNACE WITH EASILY DETACHABLE MEDIA BOX

CROSS REFERENCE TO RELATED APPLICATIONS

This application derives and claims priority from U.S. provisional application 61/369,365 filed 30 Jul. 2010, which application is incorporated herein by reference.

STATEMENT REGARDING FEDERALLY SPONSORED RESEARCH OR DEVELOPMENT

Not applicable.

BACKGROUND OF THE INVENTION

This invention relates in general to furnaces for melting metals and more particularly to a regenerative furnace having an easily detached media box.

Some furnaces that supply molten metal for casting and other procedures utilize regenerative furnaces to improve efficiency. The typical regenerative furnace includes an enclosure having a hearth at its bottom for containing a molten metal, which is often aluminum. At one end of the furnace the hearth has tap holes for withdrawing the molten metal. At the other end the furnace has two ports located above the hearth, and these ports are connected to burner assemblies that operate alternately for supplying hot gases to the interior of the furnace enclosure—indeed, hot enough to maintain the metal in the hearth in a molten condition.

Regenerative burners operate as a duel burner unit or as a pair, i.e., burner "A" and burner "B". While burner "A" is firing, the media in its media box is releasing stored heat to the combustion air entering the furnace to elevate the temperature of the combustion air. The combustion air flows through the media in the media box to the burner head to mix with the gas or oil for combustion in the furnace. At the same time, burner "B" is being utilized as an exhaust system for the combustion hot waste gasses. An exhaust fan draws these hot waste gasses through the burner head of burner "B" and through the media in the burner "B" media box, where the hot waste gasses elevate the temperature of the media and the media bed lining. Once the exhaust gasses downstream of the media box reach a predetermined temperature, which usually takes about 40 to 60 seconds, a pair of air/exhaust duct cycling valves reverse their positions. This switches burner "A" from the burner firing into the furnace to the burner exhausting out of the furnace, and simultaneously switches burner "B" from the burner exhausting to the burner firing. These air/exhaust duct cycling valves are used for switching and reversing the flow of hot gases and combustion air through the media beds.

Each burner assembly has a burner and a media box containing a media that serves as a heat sink. The media usually takes the form of ceramic alumina spheres about one-inch in diameter. When the burner of one burner assembly operates, the hot exhaust gases that it produces discharge into the furnace enclosure above the molten metal and exhaust through the other burner assembly, passing through the media box of that other assembly. Here, the hot exhaust gasses elevate the temperature of the media as the media absorb heat from the hotter gases. After passing through the media, the hot waste gasses discharge into a lateral duct near the bottom of the media box. Then about 40 seconds later the burner shuts down and the burner of the assembly through which the hot gases formerly discharged ignites, the flow of hot gases reverses and combustion air flows through the furnace enclosure. The combustion air for that burner passes through the hot media in the media box for that burner assembly where the temperature of the combustion air is elevated as the media release their stored heat into the cooler gases. Hence, the burner operates more efficiently. Of course, the hot gases from the furnace enclosure now flow out of the idle burner assembly and elevate the temperature of the media in the media box of that assembly. The burners of the two burner assemblies alternate in supplying hot gases to the furnace enclosure, so that the molten metal within the hearth is continuously subjected to hot gases.

During this process, a dross develops over the surface of the molten metal in the hearth that contains various contaminants, such as salts and oxides of aluminum, which the hot exhaust gases pick up. As the gases flow through the media in the media boxes of the two burner assemblies, they deposit some of those contaminants onto the media. These deposits will eventually clog the media. Hence, from time to time each media box is detached from the burner and the lateral duct to which it is connected and taken to a remote location where the media are cleaned and otherwise reconditioned. This is a time-consuming procedure that traditionally requires removing bolts from hot flanges where the burner and the lateral duct couple to the media box and then maneuvering the heavy media box away from the burner and duct without damaging either.

It is therefore desirable to provide a burner assembly in which the media box is adapted to rapidly disconnect from and reconnect to the burner and duct associated with high a temperature furnace. The burner assembly of the present invention overcomes the problems described above and provides significant benefits over existing configurations.

DESCRIPTION OF THE DRAWINGS

The illustrative embodiments of the present invention are shown in the following drawings which form a part of the specification.

DETAILED DESCRIPTION OF INVENTION

Figure 1:
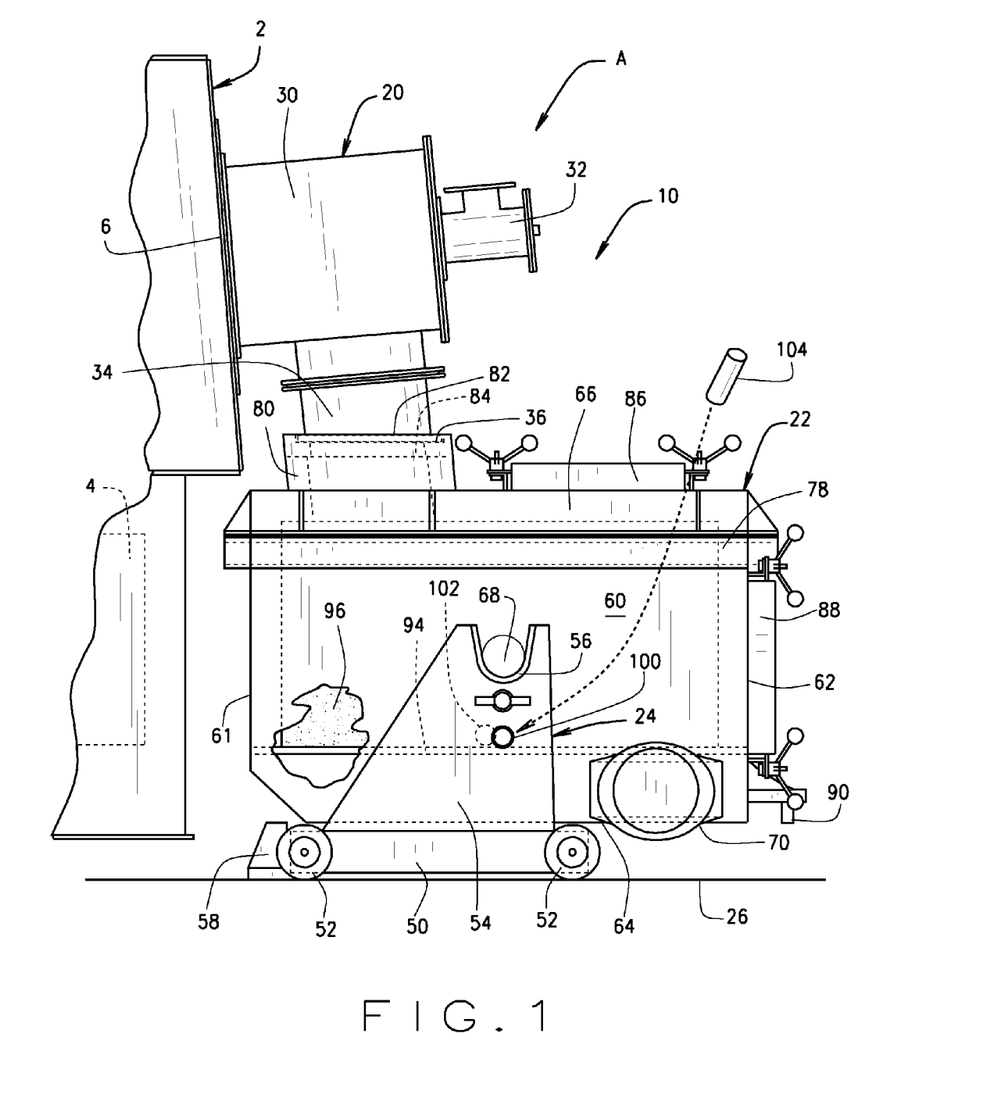
FIG. 1 is a side elevation view, partially broken away, of a furnace constructed in accordance with and embodying the present invention.
Figures 2, 3, 4:
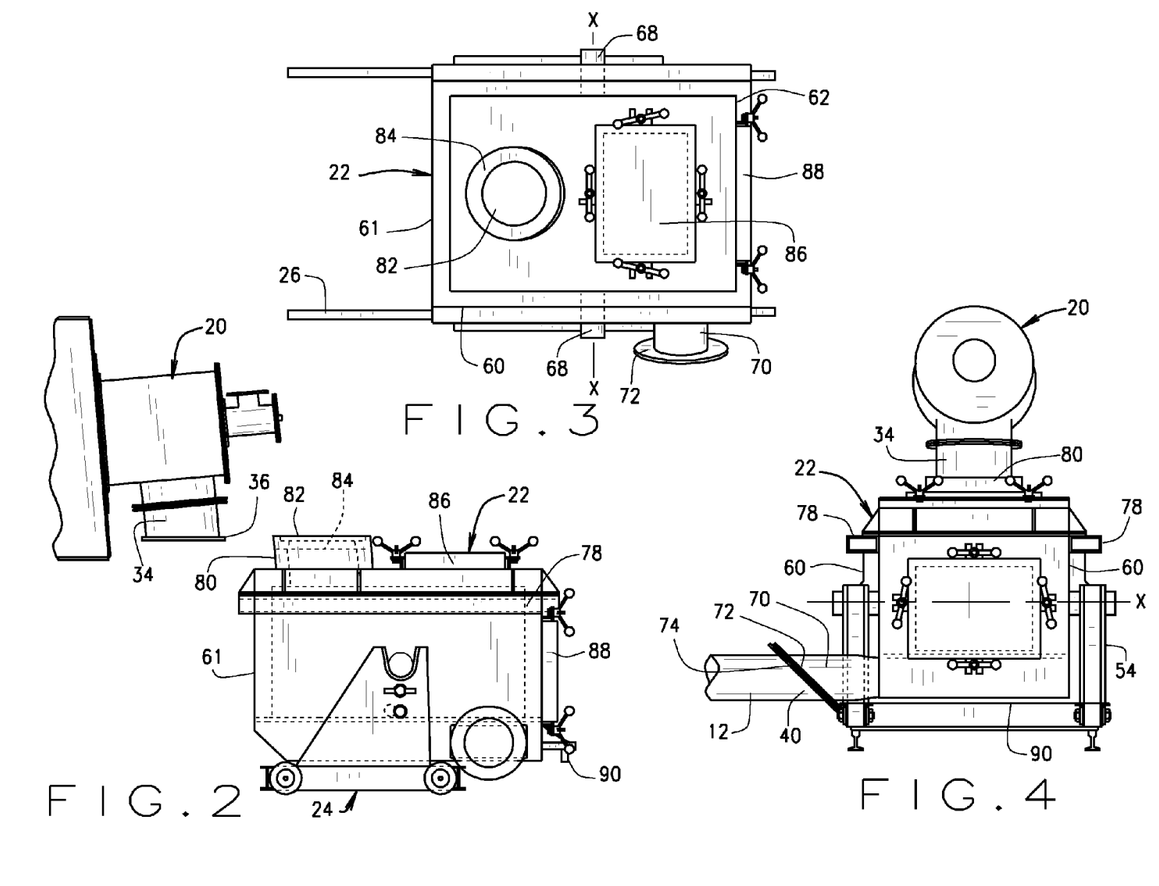
FIG. 2 is an elevation view of the burner assembly for the furnace with the media box of that assembly withdrawn from the burner.
FIG. 3 is a plan view of the media box and carriage, with the media box disengaged from the furnace.
FIG. 4 is an end elevation view of the burner assembly engaged with a furnace.
Figure 11:
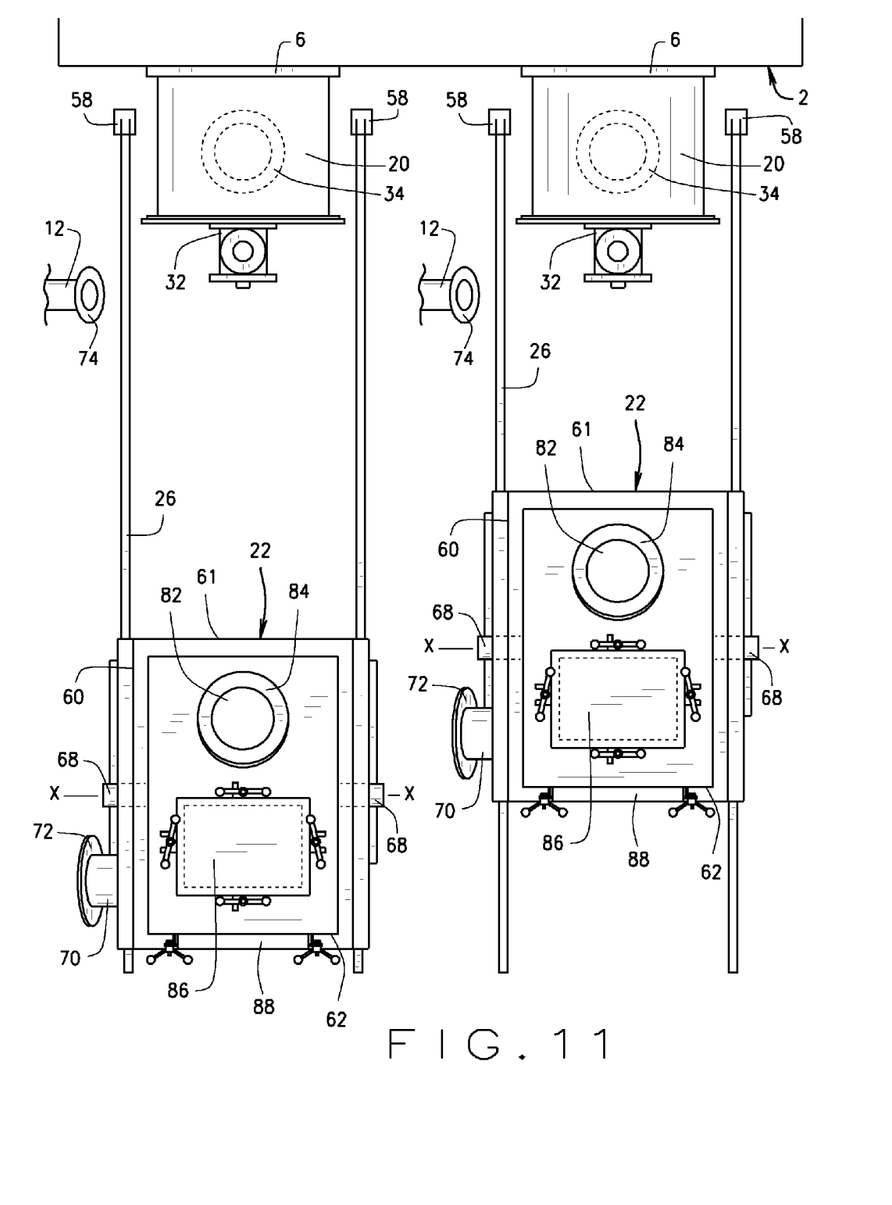
FIG. 11 is a plan view of a furnace constructed in accordance with and embodying the present invention having two interchangeable burner assemblies.

Referring now to the drawings, a regenerative furnace A (FIGS. 1, 5-7) for melting metal and maintaining the metal in a molten state includes a furnace enclosure 2 and a hearth 4 within the enclosure 2 for containing the molten metal. At its one end the enclosure 2 has two ports 6 (FIG. 11) at which two separate yet interchangeable burner assemblies 10 are connected to the enclosure 2. The burner assemblies 10 operate alternately such that while one or the other discharges hot gases, the product of combustion into the furnace enclosure 2, the other burner assembly 10 receives the hot exhaust gasses from the furnace enclosure 2 and directs it into a laterally directed duct 12 (FIG. 4). The duct 12 acts to supply gases for combustions when not acting to exhaust gasses from the furnace enclosure 2.

Each burner assembly 10 includes a burner 20 that is mounted on the furnace enclosure 2, a media box 22 that is located between the burner 20 and the lateral duct 12, and a carriage 24 that supports the media box 22 such, the burner assembly 10 being configured such that it can with relative ease be withdrawn away from the lateral duct 12 and burner 20. To this end, the carriage 24 moves along rails 26 that extend past the lateral duct 12 and generally beneath the burner 20.

The burner 20 (FIG. 1) includes a burner head 30 that is attached to the furnace enclosure 2 at one of the ports 6 of the enclosure 2 such that its interior opens into the interior of the enclosure 2. The head 30 has several nozzles 32 that discharge one or more combustible gases into the head 30 where the gas or gases mix with combustion air and ignite to produce a flame that is directed through the burner head 30 and into the interior of the furnace enclosure 2. That combustion air enters the head 30 through a burner throat 34 that extends generally downwardly from the head 30. At its lower end, the throat 34 has a flange 36 that is disposed generally horizontally, but slightly askew such that the flange 36 is presented upwardly at a slight angle away from the enclosure with respect to the vertical.

The lateral duct 12 (FIG. 4) also has a flange 40, but its flange 40 is presented upwardly at an oblique angle with respect to the horizontal, preferably at 45°.

The carriage 24 (FIG. 1) has a frame 50 fitted with wheels 52 that rest on and are capable of rolling along the rails 26. The frame 50 supports side walls 54 that are spaced far enough apart to receive the media box 22 between them without binding. At their upper ends, the side walls 54 have cradles 56 that define an axis X that extends horizontally and transversely with respect to the rails 26. The rails 26 enable the carriage 24 to move toward and away from the furnace enclosure 2, but have stops 58 that establish a fixed position beyond which the carriage 24 cannot advance farther toward the furnace enclosure 2.

The media box 22 includes (FIGS. 1, 3 & 4) spaced apart side walls 60, and spaced apart end walls 61 and 62, one of which end walls 61 is positioned at the front of the box 22 where it is presented toward the furnace enclosure 2 and the other of which end walls 62 is at the back of the box 22 and is presented away from the enclosure 2. In addition, the box 22 has a bottom wall 64 and a top lid 66. All of the walls 60-62, 64 and the lid 66 are arranged to provide the box 22 with an orthogonal configuration. The spacing between the two side walls 60 is less than the spacing between the side walls 54 of the carriage 24, so that the media box 22 will fit freely between the side walls 54 of the carriage 24 to be supported above the frame 50 of the carriage 24. To this end, the box 22 has trunnions 68 that project laterally from its side walls 60 and into the cradles 56 on the side walls 54 of the carriage 24, and when so disposed a space exists between the bottom wall 64 of the box 22 and the frame 50 of the carriage 24. This enables the media box 22 to pivot about the axis X on the carriage 24. Moreover, the trunnions 68 are offset horizontally from the horizontal center of gravity for the media box 22 such that the horizontal center of gravity is located between the trunnions 68 and the back end wall 62. As a consequence, the media box 22 seeks to rotate about the axis X such that the front end wall 61 will seek to move upward, the rear end wall 62 will seek to move downward, and the media box 22 will seek to assume a tilted position on the carriage 24.

One of the side walls 60 near the bottom wall 64 has a port 70 that opens laterally and terminates at a flange 72 that lies oblique to the horizontal at an angle corresponding to the angle of the flange 40 on the lateral duct 12. The flange 72 carries a high temperature seal 74 that interfaces with the flange 40. Near the lid 66, the side walls 60 have fork lift rails 78, which can receive the tines of a fork on a lift truck.

The lid 66 of the media box 22 has a vertical port 80 that opens into the interior of the box 22 near the front end wall 61. The port 80 terminates at a pocket 82 that is large enough to receive the flange 36 on the burner throat 34. The pocket 82 contains high temperature seal 84 at its base. The pocket 82 does indeed receive the flange 36 on the burner throat 34, but only when the forward most wheels 52 of the carriage are against the stop 58 on the rails 26. Moreover, when the box 22 is so disposed, its lateral port 70 aligns with the lateral duct 12, and the flange 40 on the duct 12 seats against the seal 74 of the flange 72 on the port 70. In addition to the vertical port 80, the lid 66 has a re-sealable top latch door 86 for gaining access to the interior of the box 22. Moreover, the lid 66 itself is removable from the media box 22.

The back end wall 62 also has a removable latch door 88 that when removed exposes the interior of the box 22. Further, the end wall 62 also has a bracket 90 at which an upwardly directed force may be applied to the box 22 to tilt it on its trunnions 68 about the axis X.

Normally, the box 22, owing to the displacement of its center of gravity rearward from the trunnions 68, seeks to tilt downwardly at its bracket 90, but when the media box 22 is positioned such that the pocket 80 is receiving the burner throat 34, the rotation of the media box 22 about its trunnions 68 is restrained by the burner 20, since the flange 36 of its burner throat 34 is in the pocket 82 of the vertical port 80. Indeed, the off-center force from the forward location of the trunnions 78 acts to seat the high temperature seal 84 that is in the pocket 82 snugly against flange 36 on the burner throat 34. The off-center force also seats the seal 74 on the oblique flange 72 of the lateral port 70 snugly against the oblique flange 40 or the lateral duct 12. Of course, if utilized, the pin 104 positioned in the bores 100 and 102, must first be removed to allow the media box 22 to freely rotate about its axis X in the carriage 24.

Referring to FIG. 1, a through bore 100 is positioned in one of the side walls 54 of the carriage 24 such that it aligns with a bore 102 in the corresponding side wall 60 of the media box 22 when the media box 22 is rotated about its axis X to disengage the media box 22 from the furnace A. A pin 104, configured to fit within the bores 100 and 102, can then be placed through the through bore 100 and into the bore 102 to prevent the media box 22 from further rotating about its axis X until the pin 104 is removed. Pressure from the tendency for the media box 22 to rotate about its axis X will hold the pin 104 in place in the bores 100 and 102. In fact, it will be necessary to apply rotational counter pressure to the media box 22 to allow the pin 104 to be readily withdrawn from the bores 100 and 102.

The media box 22 (FIG. 1) contains a grid-like rack 94 that extends horizontally from end wall 61 to end wall 62 and likewise horizontally from one side wall 60 to the other. The rack 94 lies immediately below the latch door 88 in the back end wall 62 and above the port 70 in the one side wall 60. The rack 94 supports media 96 consisting of discrete elements, which may be spherical or some other configuration and are formed from a substance capable of withstanding the temperature of exhaust gases leaving the furnace enclosure 2 and passing into the media box 22 at the burner throat 34. Such media 96 may comprise, for example, ceramic alumina spheres of about one inch diameter. These exhaust gases pass through the media 96 and heat the media 96, thus elevating the temperature of the media 96 to enable the media 96 to serve as a heat sink. When the furnace cycle reverses, combustion air enters the media box 22 at the lateral port 70 and flows through the media 96 to extract heat from them. As a consequence, the combustion air undergoes an increase in temperature, so that it enters the burner 20 at an elevated temperature. This renders the combustion in the burner 20 more efficient.

However, in flowing through the furnace enclosure 2, the hot exhaust gases pick up contaminants such as salts and metal oxides, including aluminum oxides and salts, from the dross that floats over the molten metal in the hearth. When the hot exhaust gases flow from the furnace enclosure 2 in the opposite direction into the media box 22 while the burner 20 is shut down, the contaminants picked up by the hot exhaust gases deposit on the media 96. As a consequence, from time to time the media box 22 needs to be detached from the burner assembly 10 and the lateral duct 12 so that the media 96 within it can be cleaned.

Figure 5:
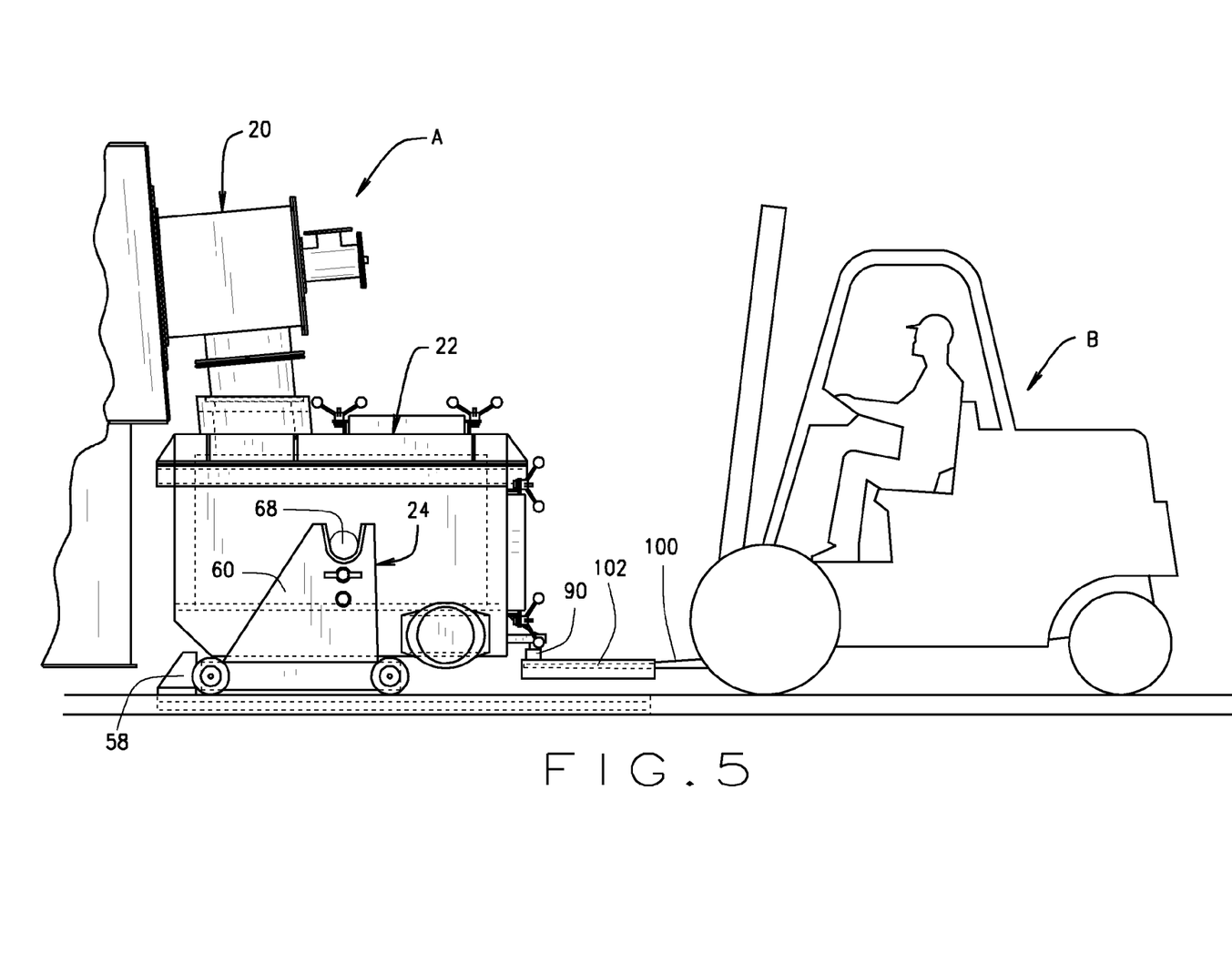
FIG. 5 is a side elevation view of the burner assembly showing the media box engaged by a lift truck, but not yet displaced.
Figure 6:
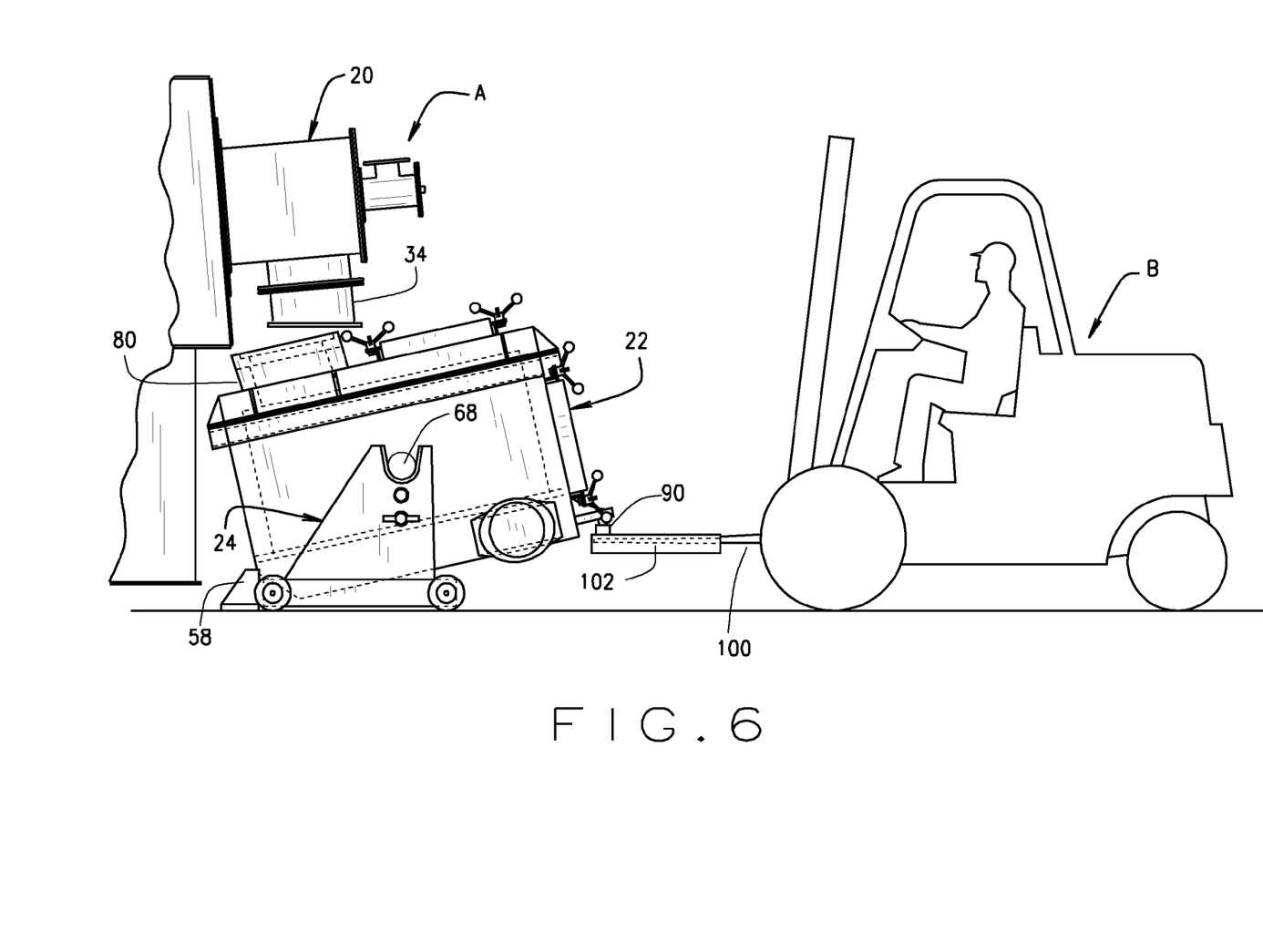
FIG. 6 is a side view similar to FIG. 5, but showing the truck tilting the media box in the carriage to separate the media box from the burner.
Figure 7:
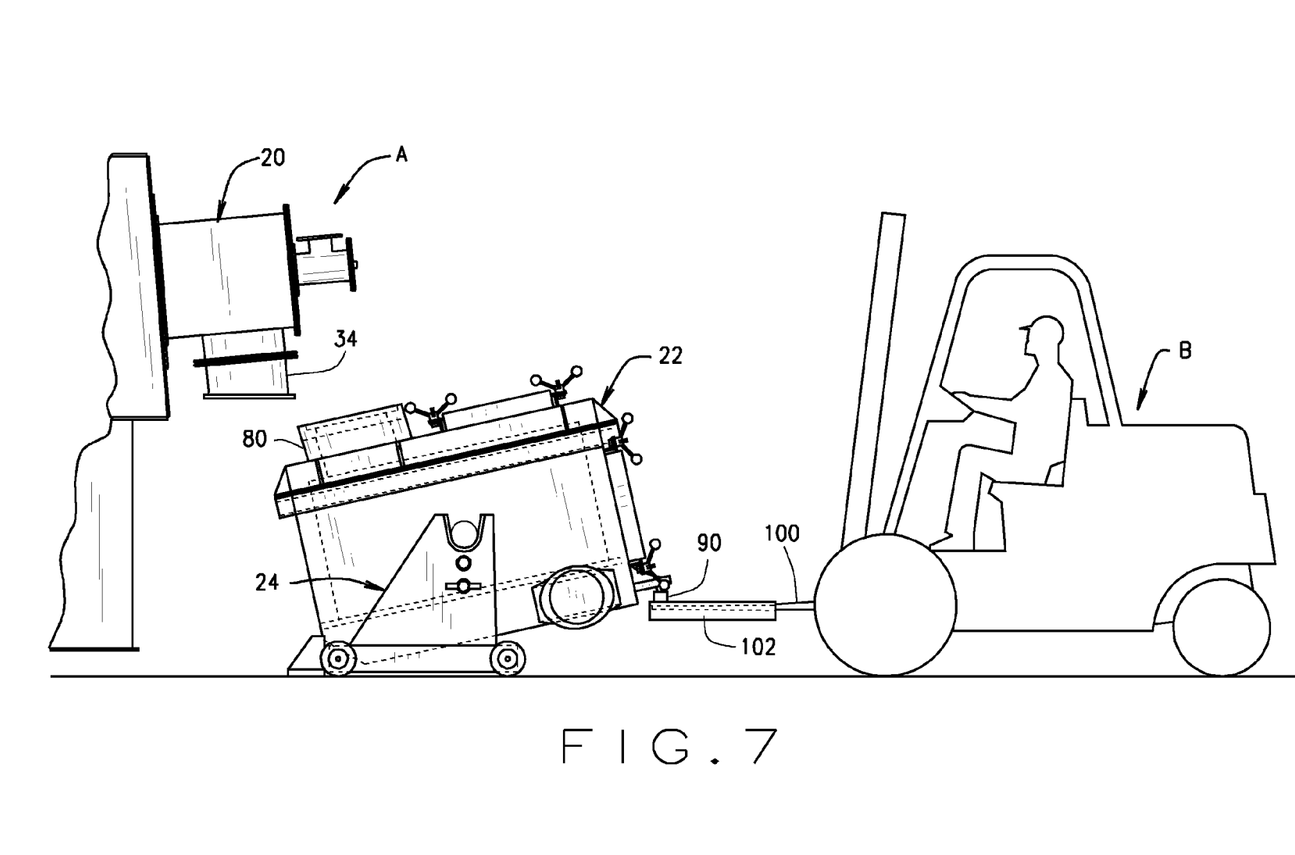
FIG. 7 is a side view similar to FIG. 6, but showing truck withdrawing the media box and carriage from the burner.

When using the present invention, this detachment is a quick and simple procedure. To this end, a lift truck B (FIGS. 5-7) having a fork 100 that can be maneuvered upwardly and downwardly is fitted at the very front of its fork 100 with an attachment tool 102 that is capable of engaging the bracket 90 at the back end of the media box 22 from beneath such that the truck B can exert an upwardly directed force on the bracket 90 as well as a horizontal force along the direction of the rails 26. Indeed, the truck B is maneuvered to bring the attachment tool 102 beneath the bracket 90 on the media box 22 (FIG. 5). Thereupon, the fork 100 is elevated while the truck B itself remains stationary (FIG. 6). The upwardly directed force tilts the media box 22 about the axis X of the trunnions 68, causing the front end of the media box 22 to dip downwardly and its back end to rise. Thereupon the pocket 82 at the front of the box 22 withdraws from the burner throat 34. Simultaneously, the oblique flange 72 on the port 70 lifts off the oblique flange 40 in the lateral duct 12 (FIG. 7). The operator of the lift truck B then reverses the truck B to pull the media box 22 away from the burner assembly 10 and lateral duct 12.

The box 22 moves on the carriage 24 which follows the rails 26 away from burner throat 34 until the box 22 is positioned such that it will not contact the burner throat 34 when the box 22 is allowed to rotate within the carriage 24 to its point of rest with the bracket 90 pressed against the ground below the box 22. The box 22 may then be raised and removed from the carriage 24. The operator can then deliver the media box 22 to a location where the media 96 may be removed from it. This may, for example, involve removing the attachment tool 102 from the fork 100 of the lift truck B and inserting the tines of the fork 100 into the fork lift rails 78 of the media box 22. Alternately, the lid 66 may be removed to gain access to the media 96.

Once the media 96 are cleaned and replaced in the media box 22, the truck operator maneuvers the truck B so that the box 22 is placed atop the carriage 24 with the trunnions 68 resting in the cradles 56 in the side walls 54 of the carriage 24, where the carriage 24 has remained positioned atop the rails 26. The operator of the truck B then places the attachment tool 102 on the fork 100 of the truck B and engages tool 102 with the bracket 90 on the back end of the media box 22. An upwardly directed force applied to the bracket 90 tilts the box 22 on the carriage 24, lowering the pocket 82 in its vertical port 80 and elevating the lateral port 70 on its one side wall 60 (FIG. 7). The operator moves the truck, and thereby the carriage 24, forwardly toward the furnace enclosure 2 until the forward wheels 52 of the carriage 24 abut against the stops 58 at the ends of the rails 26 (FIG. 6). The operator then lowers the fork 100 and, by reason of the displacement of its center of gravity from the trunnions 68, the media box 22 tilts back to a horizontal orientation in which it is restrained by the flange 36 on the burner throat 34 (FIG. 5). The flange 36 seats in the pocket 82 of the vertical port 80, effecting a barrier with the seal 84 in that pocket 82. The seal 74 in the oblique flange 72 of the lateral port 70 likewise seats against the oblique flange 40 at the end of the lateral duct 12 (FIG. 4).

Figure 8:
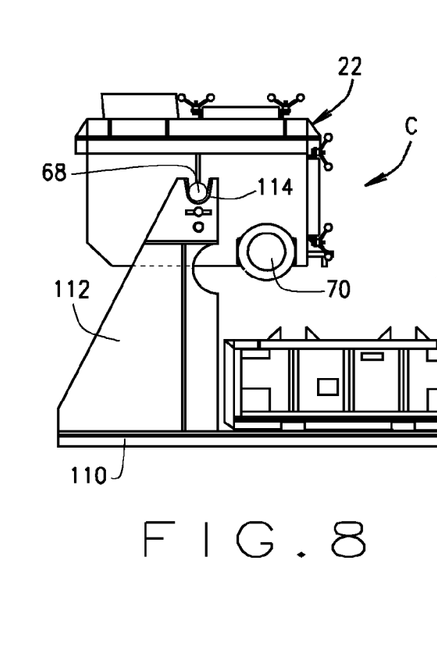
FIG. 8 is a side elevation view showing the media box at a media washing station.
Figure 9:
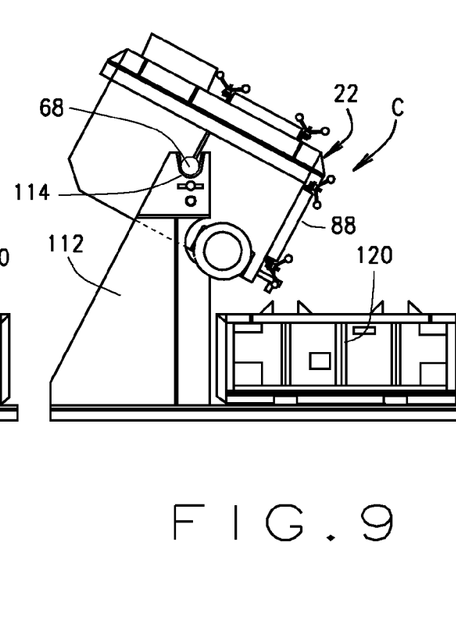
FIG. 9 is an elevation view similar to FIG. 8, but showing the media box tilted to discharge the media into a washing basket at the media washing station.
Figure 10:
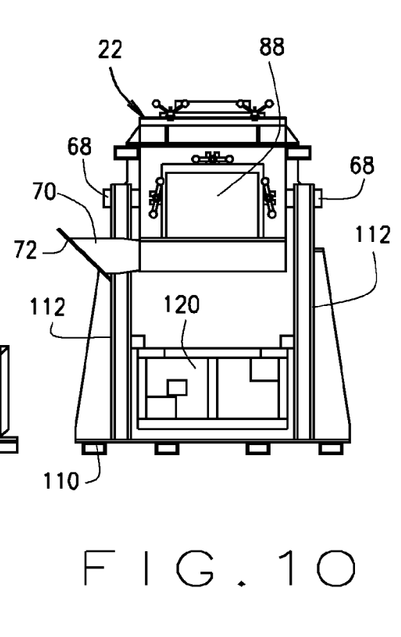
FIG. 10 is an end elevation view showing the media box at the washing station.

The construction of the media box 22 and its placement at the end of the furnace enclosure 2 on the carriage 24 not only facilitates rapid removal of the media box 22, but also the actual removal of contaminants from the media 96. In this regard, once the media box 22 is separated from the burner throat 34 and the lateral duct 12, and is withdrawn from those furnace components by the truck B, the truck operator engages the fork 100 of the truck B with the fork lift rails 78 along the side walls 60 of the media box and delivers the media box 22 to a media cleaning station C (FIGS. 8-10). The station C includes a frame 110 that has side walls 112 that are spaced apart sufficiently to enable the media box 22 to freely fit between them. Moreover, the side walls 112 at their upper ends have cradles 114 that are capable of receiving the trunnions 68 on the media box 22 when the media box 22 is positioned between the side walls 112. This arrangement resembles the carriage 24, except that the side walls 112 are higher, and the frame 110 rests in a fixed position. The frame 110 supports a washing basket 116 that is offset from the side walls 112, yet aligned with the space between them. The washing basket 120 has porous walls, preferably formed from a grid-like material having openings smaller than the individual elements of the media 96.

To remove contaminants from the media 96, the truck operator raises the media box 22 to a position in which its trunnions 68 are above the cradles 114 of the cleaning station C and the latch door 88 on the back end wall 62 is above the washing basket 120. The operator then lowers the media box 22 until its trunnions 68 are received in the cradles 114 on the side walls 112 and the box 22 is supported by the side walls 112 (FIG. 8). Owing to the displacement of the center of gravity for the media box 22 from the trunnions 68, the media box 22 tilts downwardly toward the basket 120 once free of the fork 100 of the truck B (FIG. 9). Thereupon, the latch door 88 in the back end wall 62 of the media box 22 is removed, and the media 96 are allowed to tumble out of the box 22 into the washing basket 120. While in the washing basket 120, the media 96 are subjected to a cleaning process, such as for example a stream of water, that removes the contaminants deposited on media 96.

Once the contaminants are removed, the media 96 are returned to the media box 22 where the media 96 are supported on the porous rack 94. Thereupon, the media box 22 is moved to the carriage 24 and the carriage 24 is maneuvered to bring the pocket 82 of the box 22 beneath and in pressed contact with the burner throat 34, and to simultaneously align and interconnect the port 70 with the lateral duct 12.

In lieu of the media 96 which takes the form of a multitude of discrete elements organized randomly on the rack 94, the high temperature heat sink in the media box 22 may take other alternate forms, such as the form of a solid block that is porous. Indeed, the block may be oriented vertically so that the gases flow horizontally through it.

While we have described in the detailed description different configurations that may be encompassed within the disclosed embodiments of this invention, numerous other alternative configurations, that would now be apparent to one of ordinary skill in the art, may be designed and constructed within the bounds of my invention as set forth in the claims. Moreover, the above-described novel burner assembly 10 of the present invention can be arranged in a number of other and related varieties of configurations without expanding beyond the scope of my invention as set forth in the claims.

For example, the present invention is not limited to a single or even two sets of assemblies 10, but may include multiple sets of interchangeable media boxes 22 and carriages 24. Additionally, each of the components of the assembly 10 may be of varying sizes and shapes, so long as the configuration of each component, when combined in the assembly 10, allows the assembly 10 to have the unique features and attributes as described in this disclosure. Further, the assembly 10 may be configured to allow the media box 22 to releasably attach to a single port or duct (such as at 34 and 12), or multiple such ports or ducts as may be desired or necessary for the proper operation of the furnace system.

Of course, the carriage 24 may be configured to be tilted and/or withdrawn from the furnace by a variety of other methods other than by a lift truck B. For example, the carriage 24 my incorporate a motor or other such self-contained locomotion apparatus. Alternatively, dissociated pistons, pulley systems, or other such devices may alternately be used to tilt and/or move the carriage 24.

Further, depending on the configuration of the furnace and its burners and combustion gas ducts, the media box 22 may be configured to tilt or rotate forward, backward, or from side to side to engage with and disengage from such burners and ducts. In addition, it is contemplated that the operation of the assembly 10 could be automated, such as with a computer control system.

Additional variations or modifications to the configuration of the novel heater system media bed float system 10 of the present invention may occur to those skilled in the art upon reviewing the subject matter of this invention. Such variations, if within the spirit of this disclosure, are intended to be encompassed within the scope of this invention. The description of the embodiments as set forth herein, and as shown in the drawings, is provided for illustrative purposes only and, unless otherwise expressly set forth, is not intended to limit the scope of the claims, which set forth the metes and bounds of our invention.

The invention claimed is:

1. A burner assembly comprising:
   a. a burner having a body and a burner throat extending downwardly from the burner body;
   b. a carriage located below the burner and provided with a cradle;
   c. a media box configured to pivotally mate with the cradle along a horizontal axis of the media box such that the media box is supported on the carriage at the axis and can rotate on the carriage about the axis, the media box having a port that connects with the burner throat but that separates from the burner throat when the media box is tilted about its axis; and
   c. media in the media box to serve as a heat sink.

2. The burner assembly of claim 1, wherein the media box has an axial center of gravity and the axis is horizontally offset from the axial center of gravity.

3. The burner assembly of claim 2, wherein the media box has a first side wall and a second side wall separated from and opposite the first side wall, the axis being transverse to the sidewalls.

4. The burner assembly of claim 2, wherein the media box has a first end wall and a second end wall separated from and opposite the first end wall, the axis positioned between the first end wall and the axial center of gravity for the media box.

5. The burner assembly of claim 1, wherein the media box is removable from the carriage.

6. The burner assembly of claim 5, wherein the media box sets atop the carriage.

7. The burner assembly of claim 6, wherein the media box comprises a trunnion positioned on the media box at the axis, and the carriage comprises a cradle configured to rotatably receive the trunnion.

8. The burner assembly of claim 1, wherein the carriage is movable.

9. The burner assembly of claim 8, wherein carriage and media box are configured to allow for the withdrawal of the media box away from the burner after the media box has been tilted to separate the media box from the burner throat.

10. The burner assembly of claim 8, further comprising rails upon which the carriage moves.

11. The burner assembly of claim 10, further comprising rail stops positioned on the rails in proximity to the burner to limit the travel of the carriage in the direction of the burner.

12. The burner assembly of claim 1, further comprising a duct configured to supply combustion gases to the burner and alternately to receive exhausted combustion gases from the burner, the media box further comprising a second port that connects with the duct but that separates from the duct when the media box is tilted about the axis.

13. A cyclic burner system comprising:
   a. two burners, each burner having a body and a burner throat extending downwardly from the burner body;
   b. two carriages, each carriage located below one of said two burners and each carriage provided with a cradle;
   c. two media boxes, each configured to pivotally mate with one of said two cradles along a horizontal axis of the media box such that the media box is supported on the corresponding carriage at the axis and can rotate on the carriage about the axis, each media box having a port that connects with on of the two said burner throats but that separates from that burner throat when the media box is tilted about its axis; and
   c. media in each of the media boxes to serve as a heat sink; wherein the media boxes are interchangeable.

14. The burner system of claim 13, wherein each of the media boxes has an axial center of gravity and the axis for each media box is horizontally offset from its axial center of gravity.

15. The burner system of claim 13, wherein each of said media boxes removably sets atop its one of said two carriages.

16. The burner system of claim 15, wherein each media box comprises a trunnion positioned on the media box at the media box axis, and both carriages comprise a cradle configured to rotatably receive either trunnion.

17. The burner system of claim 13, wherein each carriage is movable, and both carriages and media boxes are configured to allow for the withdrawal of the media boxes away from their respective burners after the media box has been tilted to separate the media box from the burner throat.

\* \* \* \* \*